Patented Mar. 29, 1927.

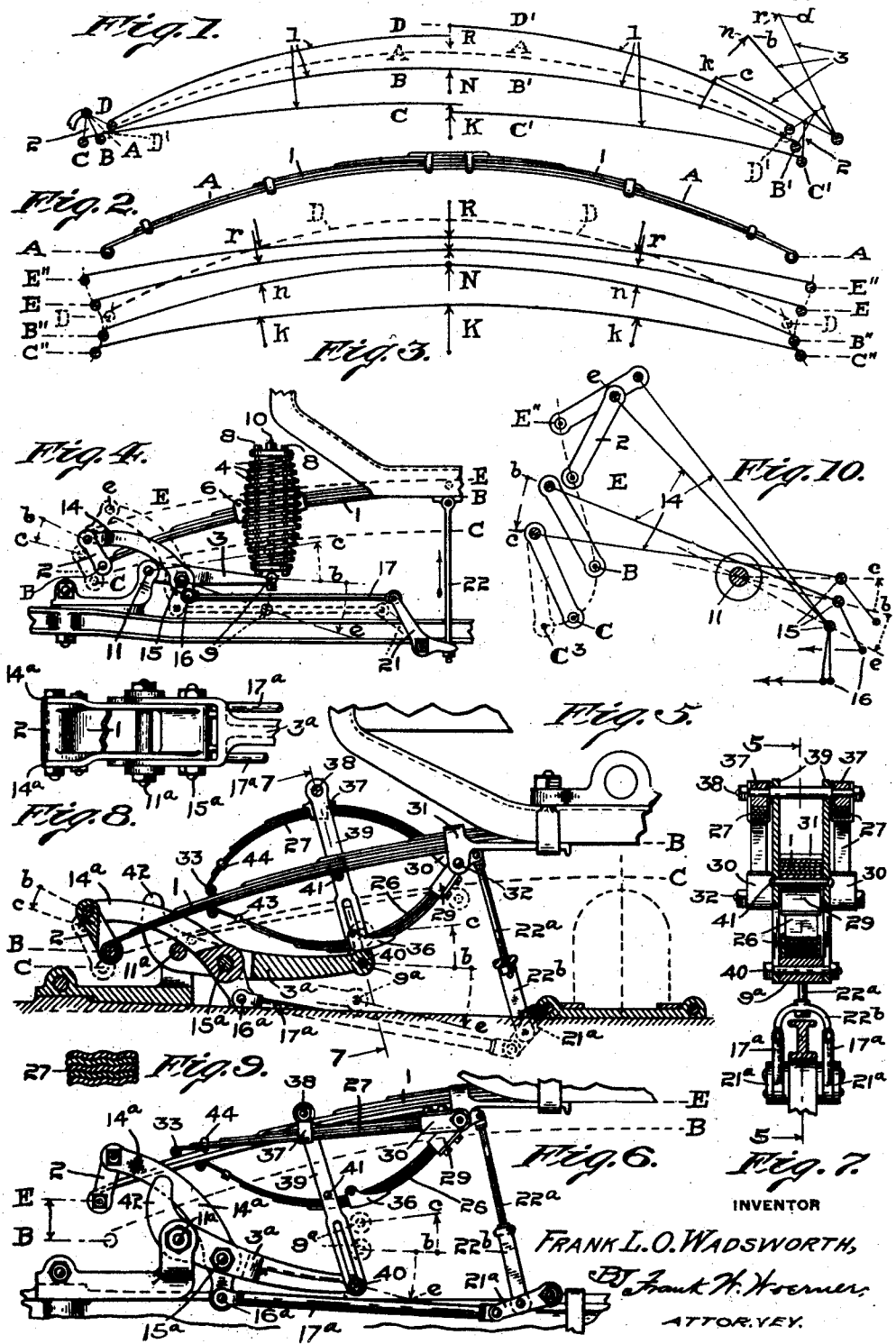

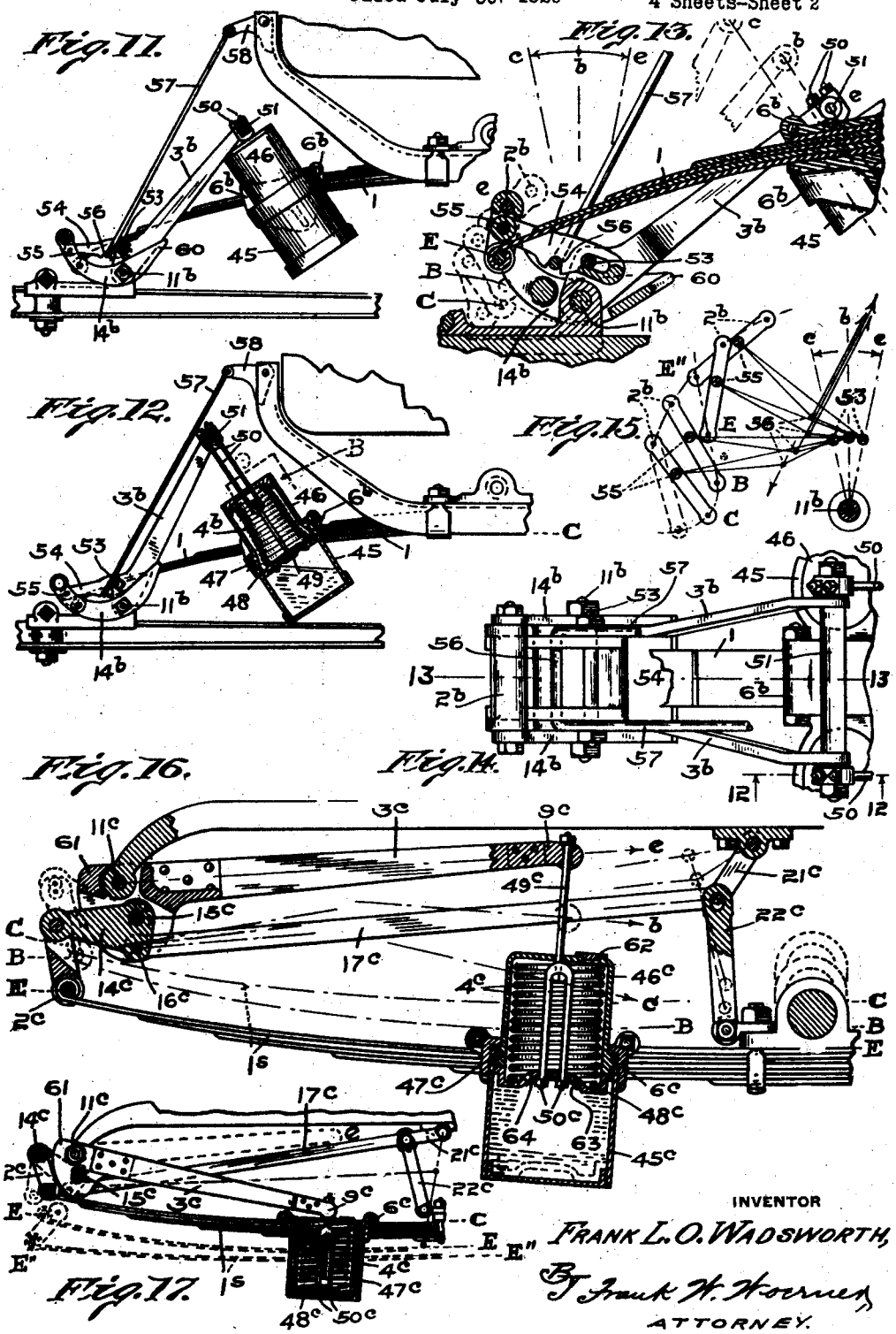

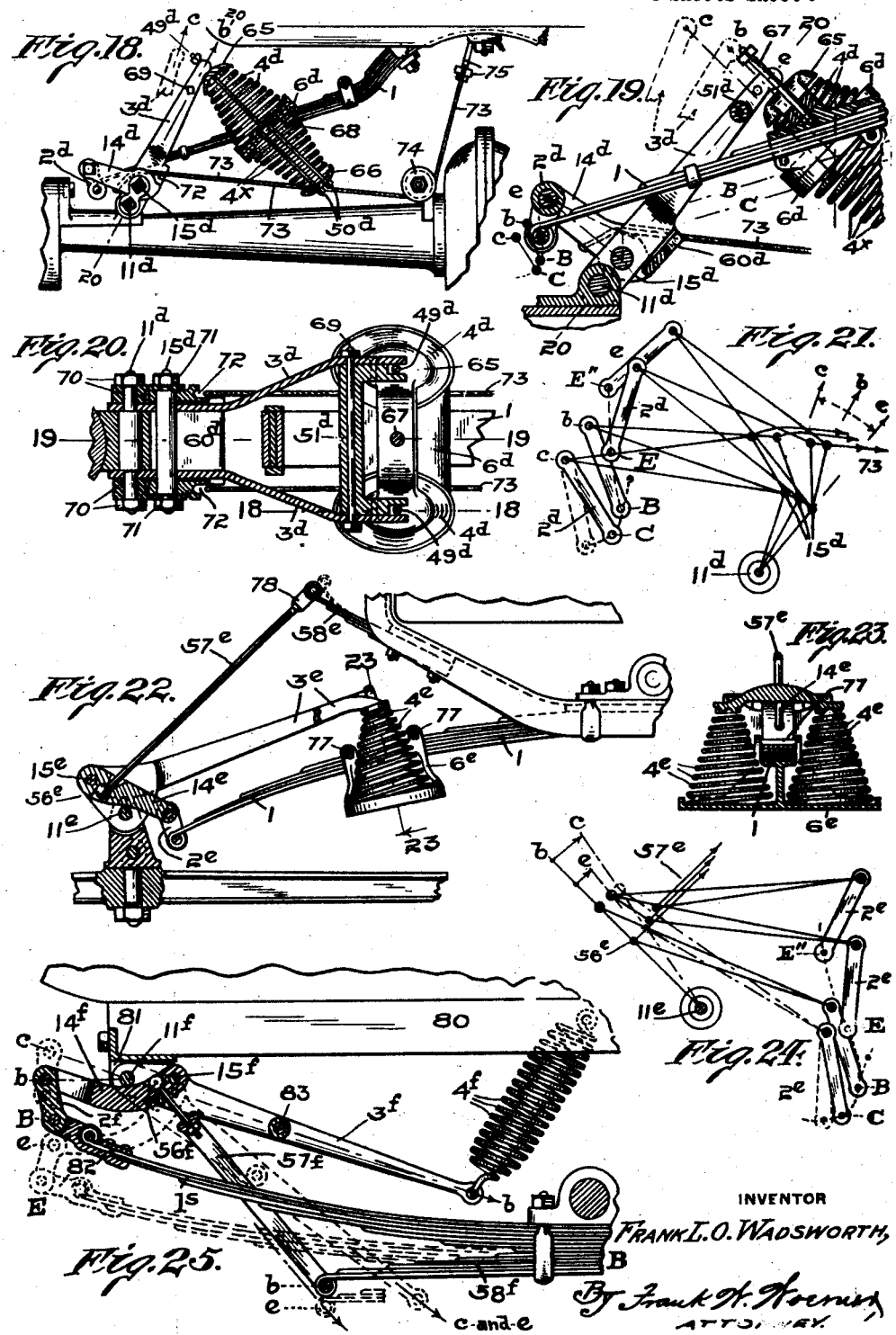

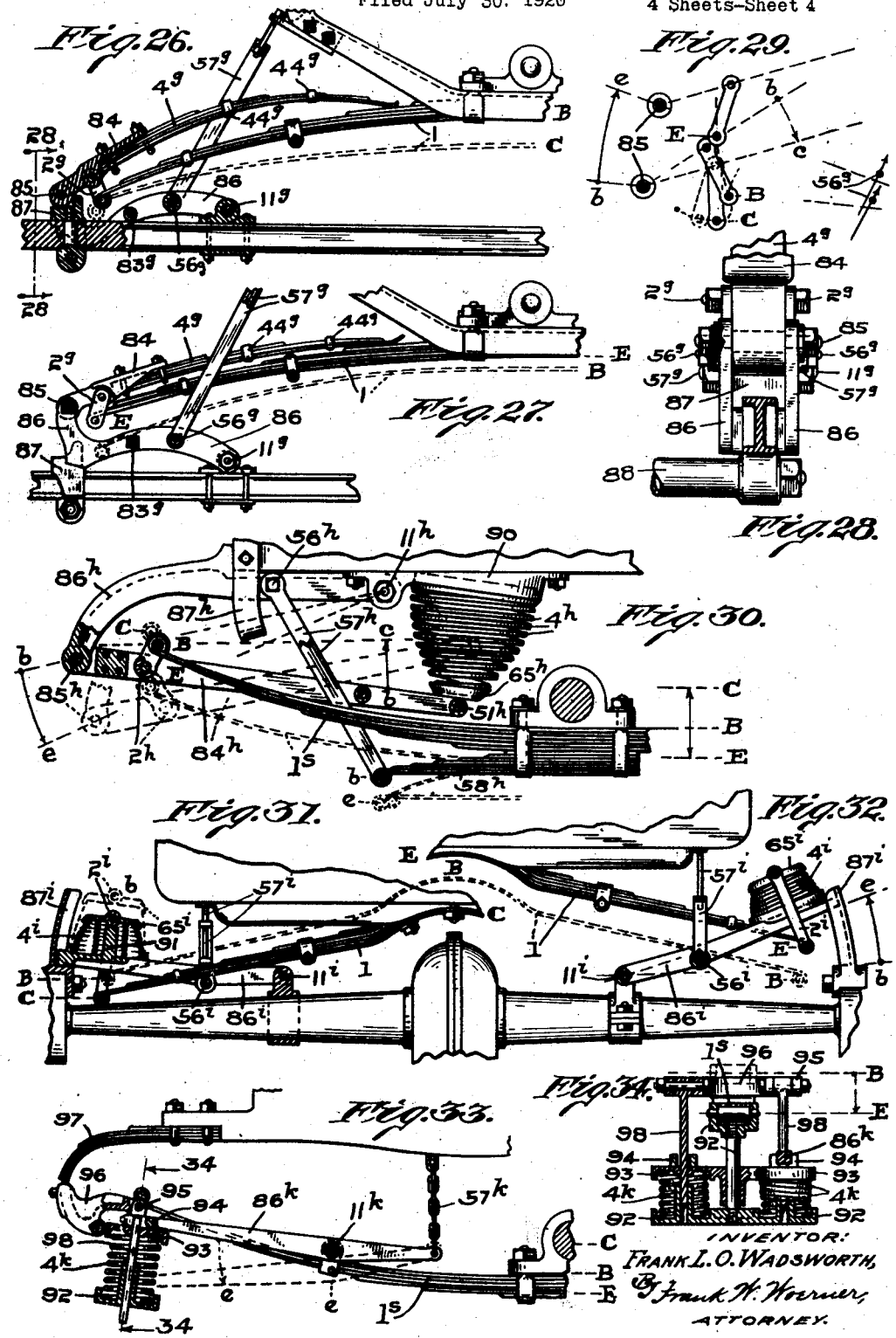

1,622,891

UNITED STATES PATENT OFFICE.

FRANK L. O. WADSWORTH, OF PITTSBURGH, PENNSYLVANIA.

SPRING SUSPENSION SYSTEM FOR MOTOR VEHICLES.

Application filed July 30, 1920. Serial No. 400,256.

My invention relates to elastic suspension systems for vehicles, and particularly to those types of organization which comprise combinations of relatively heavy and stiff main springs with comparatively light, pliant and long range secondary, or supplemental, springs interconnected and conjoined—to act either concurrently or successively, in parallel or in series—by means of rocking lever or "bridge" members; and which are, for that reason, generally designated as lever-actuated-supplemental spring systems.

The generic object of this invention will be best understood by referring to the diagrams of Figs. 1, 2 and 3. In an ordinary main spring suspension (such as is conveniently indicated in Fig. 1) the center of the resilient leaf element 1, is bolted, or otherwise rigidly secured, to one of the relatively movable members of the vehicle chassis (e. g., the body or tonneau); and the ends of this element are flexibly coupled to the other of the relatively movable chassis members (e. g., the axle) by means of swinging shackle links 2—2. The initial unloaded form of this spring is shown in Fig. 2 and is indicated by the dotted lines A—A of Fig. 1. When the vehicle body is subjected to its normal load the main spring is somewhat flattened and the parts assume the position indicated by the lines B—B. When either of the chassis members is subjected to a sudden shock which tends to force it toward the other member, the compression stress on the spring is increased; and the element is further flexed or bent to the form shown in the lower line (C) of the diagram. This increased flexure imposes a reactive strain, K, on the suspension system, which is in excess of the normal load strain, N; and as soon as the effect of the compressive shock has been absorbed or neutralized by this increased elastic strain in the spring, the latter tends to immediately "recoil" or expand to its initial position. But this return movement imparts a "swing" to the chassis members that will, in most cases, carry the parts above the normal load position, B, and even beyond the position A; and in such cases the main spring is subjected to an opening or a rebound stress that tends to shorten, and bend it negatively to the form shown in the upper line, D, of Fig. 1. Under such circumstances a reverse strain is imposed on the individual leaves of the spring which helps to check the separation of the body and axle parts, but which is detrimental to the resilience and the life of the elastic suspension member.

The degree, or amount, of positive and negative bending of the main leaf spring— for a given movement of approach or separation of the body and axle parts—may be diminished by the use of a supplemental lever-actuated spring in series with the said main spring. In such a combination the secondary lever-spring system, 3, is ordinarily interposed between the main spring shackle support 2 and that part of the vehicle to which said support is usually attached; as shown in the right hand portion of Fig. 1. When this organization is subjected to compressive stresses the supplemental spring is flexed by the downward movement of the main spring and lever system 1—2—3; and the parts assume a position indicated by the lines C'—C'—c, in which the two elastic elements are conjointly subjected to positive strains, K and k, that tend to restore the members to their initial load position B'—B'—b. But the free recoil and subsequent rebound of the springs will carry the members beyond the loci of static equilibrium to the position D'—D'—d, in which the main spring is subjected to a reverse or negative bending strain R, that is not ordinarly accompanied by any cooperative secondary spring resistance, but is, on the contrary, usually opposed in part by some unexpended positive strain r in the expanding supplemental spring.

In consequence of these characteristic features of operation the supplemental spring suspension systems last considered have a wide range of flexibility and a very effective action in restraining and absorbing compressive shocks; but the increase in sensitiveness thus obtained tends, in itself, to permit an increased degree of freedom in recoil, and an augmented "rebound" or "overthrow" of the parts on their return movements. In order to overcome this last difficulty the supplemental-lever-actuated-spring member of the combination may be so designed and arranged as to be "double acting" in character; i. e., so constructed and conjoined with the main spring element as to be subjected to an increased flexural strain whenever the parts move in either direction from the normal load, or static balance, position B'—B'—b. Typical examples of such construction are disclosed in the Hassler Patents Nos. 1,130,897 of March 9, 1915 and 1,149,756 of August 10, 1915; and also in applicant's copending applications Serial Nos. 358,817 of February 16, 1920, and 389,337 of June 16, 1920. But in all of these constructions the main leaf spring element, 1, of the combination, is either positively constrained, or freely permitted, to expand or flex negatively beyond its free unloaded form, A, when the body and axle parts rebound, or separate, considerably beyond the position of static equilibrium B'.

A primary object of my present improvements is to provide a main and supplemental spring combination in which the primary elastic element is prevented from expanding or recoiling beyond its initial unstrained, or unflexed, form; and is thereby guarded against distortion, or breakage, or loss of resiliency that may result from the negative bending, or the repeated reverse flexing of the main spring leaves or fibres. In the principal embodiments of the invention hereinafter disclosed this feature of improvement is further emphasized by the establishment of a positive bending or compression stress on the main spring element in all stages of operation, and in all positions, of the spring support system; and the general purpose of this characteristic of my improved organization is the elimination of the negative bending being of the primary spring on rebound movements, by the continued maintenance of a positive flexure strain therein.

Another important purpose of certain generic exemplifications of my invention is the invention is the provision of a main and supplemental spring combination of such a character that both of the elastic suspension elements are cooperatively and conjointly subjected to positive, or increasing, flexures when the spring supported parts move in either direction from the normal load position—of static equilibrium—and such movements (both of compression and separation) are thereby resisted and checked by a continually and progressively increased strain in both the primary and the secondary spring elements.

A futher object of my present improvements is to provide a composite spring support system in which the primary and secondary suspension elements are connected and conjoined in such manner as to most effectively utilize the flexural action of one spring in checking and controlling the cooperative flexure of the other, so as to prevent or restrain any undue, or excessive, elastic distortion of either, or both, of the resilient suspension members of the combination.

The general manner in which the above described features of organization can be functionally utilized in conjunction with a main leaf spring support is shown in the diagram of Fig 3. In this illustration the two lower curved lines B″—B″, and C″—C″ show the form and position assumed by the main spring under conditions of normal load and kinetic compression stress respectively; and the arrows $n$—$n$ and $k$—$k$ indicate the points, and the direction, at and in which the supplemental spring strains are preferably applied, to and through the main spring, in order to assist the coacting tensions, N and K, in sustaining the applied load stresses. The two upper lines E—E and E″—E″ indicate the position and form assumed by this same main spring element of my improved combination, when the parts rebound to varying heights above the normal line B″—$n$—N—$n$—B″; and the arrows R, and $r$—$r$, indicate the loci and the directions in which the primary and the secondary spring resistances are then constrained to act in effecting the quick arrest of such recoil movements. A comparison of the strain lines E—$r$—R—$r$—E, with the dotted line D—D—D, (which corresponds to the line D'—D' of Fig. 1) indicates very clearly the fundamental and essential differences between the nonreversed or irreversible spring action of my improved organization, and the reversed or reciprocal bending action that characterizes the operation of main and supplemental spring combinations heretofore used; and also indicates the marked effect of this improved action in restraining and decreasing the extent of the rebound or "overthrow" of the parts beyond, or above, the normal position of static equilibrium.

Another more specific object of my present improvements is to provide a combination of the general character above described with means for lengthening or "damping" the free period of recoil movement of the compressed spring system; thereby further retarding and checking the rebound of the parts from, and beyond, normal load position; and also stabilizing the system by diminishing the tendencies of the body to sway laterally or "pitch" longitudinally under the effect of large vertical oscillations.

A further specific object of these improvements is the utilization of a particular form of fluid damped double acting supplemental spring mechanism, in conjunction with a frictionally damped double acting main spring, for the purpose of securing an extremely sensitive elastic suspension system which is not subject to quick recoil movements, and which is capable of resiliently absorbing shocks of any magnitude, and of effectively restraining and quickly checking either vertical or lateral movements of the spring connected and supported parts.

Other additional objects, and further specific characteristics, of certain exemplifications of this invention will be made apparent by the following description of the various illustrative embodiments thereof that are depicted in the accompanying drawings, in which:

Figs. 1 and 2 are, as previously explained, diagrammatic illustrations of the form, and mode of action, of an ordinary leaf spring, when the latter is used either by itself or in conjunction with the usual type of supplemental spring end supports, as the elastic suspension member of a vehicle body; Fig. 3 is a corresponding illustration of the functional action of such a leaf spring support when it is made a part of my improved organization; Fig. 4 is a general semi-diagrammatic showing of one form of my improvements as applied to the front cross-leaf-spring suspension of a Ford type of car; Fig. 5 is a view (partly in section on the plane 5—5 of Fig. 7) of a modified form of the construction shown in Fig. 4; Fig. 6 is an elevation of the organization of Fig. 5 with the parts in the position assumed on rebound; Fig. 7 is a sectional view on the plane 7—7 of Fig. 5; Fig. 8 is a plan view of a part of the construction shown in Fig. 5; Fig. 9 is a cross section through one of the supplemental spring elements of this mechanism; and Fig. 10 is a diagram—on an enlarged scale—showing the operative action of certain parts of the organizations illustrated in Fig. 4, and Figs. 5 to 9 inclusive.

On the second sheet of drawings: Fig. 11 is an elevation of another embodiment of my invention as applied to a cross leaf spring support; Fig. 12 is a second view of this same construction, which is partly in section on the plane 12—12 of Fig. 14, and which shows the parts in the position they assume under a kinetic compressive stress; Fig. 13 is an enlarged sectional elevation on the plane 13—13 of Fig. 14, and illustrates the parts of this construction in the position assumed on rebound movement; Fig. 14 is a plan view of the construction with the parts in the position shown in Fig. 13; Fig. 15 is a diagram (similar to that of Fig. 10) illustrating the various successive positions taken by the conjoined elements of the organization depicted in Figs. 11 to 14 inclusive; Fig. 16 is a sectional side view of another exemplification of my improvements as applied to a side leaf spring suspension—the parts being here shown in the position which they assume under an excessive rebound or recoil movement; and Fig. 17 is a side elevation (on a reduced scale) of the construction of Fig. 16 with the parts in the position assumed by them under kinetic compressive stress.

On the third sheet of the drawings: Fig. 18 is an elevation (partly in section on the plane 18—18 of Fig. 20) of still another embodiment of my invention as it may be used in conjunction with the rear cross leaf spring mounting of a Ford car; Fig. 19 is a sectional elevation of this embodiment on the plane 19—19 of Fig. 20; Fig. 20 is a sectional plan view on the plane 20—20 of Fig. 18; Fig. 21 is another diagram showing the successive positions and action of the parts of the construction last described; Fig. 22 is an elevation—partly in section—of an exemplification of my improvements applied to another cross leaf spring suspension; Fig. 23 is a sectional end view on the plane 23—23 of Fig. 22; Fig. 24 is a diagram illustrating the functional action of the parts shown in Figs. 22—23; and Fig. 25 is a sectional elevation (on a central longitudinal plane) of a modification of the last mentioned organization as it might be used in conjunction with a side leaf spring support.

On the fourth sheet of drawings I have illustrated another species of the present invention: On this sheet Fig. 26 is a sectional elevation, on the vertical longitudinal plane through the center of the main cross leaf spring, of one exemplification of this species of construction; Fig. 27 is a view showing the parts of the said construction in the position assumed on rebound; Fig. 28 is a view, on the plane 28—28 of Fig. 26; Fig. 29 is a diagram illustrating the action of this organization under varying conditions of stress; Fig. 30 is a side elevation (partly in central section) of the species of construction shown in Figs. 26 to 29, as applied to a side leaf spring mounting; Figs. 31 and 32 are two similar views of another embodiment of my present improvements as applied to a rear cross leaf spring suspension of a Ford car; Fig. 33 is a side elevation (partly in section) of the species of construction shown in Figs. 31 and 32 as utilized in conjunction with a three-quarter elliptic side spring system; and Fig. 34 is an end view, partly in section, on the plane 34—34 of Fig. 33.

In the form of construction illustrated in Fig. 4, the primary suspension element is provided with a pair of secondary helical springs 4, which are mounted symmetrically one on each side of an intermediate flexible portion of the main leaf spring 1, and are connected thereto by suitable clip and follower bolt connections, 6—8—8 etc., that maintain these springs under a predetermined initial tension, and prevent them from expanding beyond the normal static load position shown in full lines in this figure. The opposite ends of the springs 4—4 are operatively engaged with the inner extremity of a forked lever 3 by means of the cross head 9 and the tension bolts 10. The lever member 3 is pivotally mounted in the axle perch boss, 11, and is connected, at an intermediate point of its length, with a double arm bridge lever, 14, by a pintle bolt 15. The opposite extremities of the bridge member 14 are coupled respectively to the end of the main spring 1 (by the shackle links 2) and to the body of the vehicle (or to the center of the main spring) by means of the "one way" or "single acting" rod and crank connections 16–17, 21–22.

When the parts are subjected to static load stress the lever 3 is in operative engagement with both extremities of the initially tensioned supplemental spring 4, and the arms of the bridge lever 14 rest on the cylindrical upper surface of the boss support 11. If now the system is subjected to an increased kinetic load or compressive shock—which tends to force the main spring and axle support toward each other—the interconnected lever elements 3 and 14 are rocked, as a unit, on the pivot bolt mounting of the lever 3; and the cross head, 9, is raised toward the upper dotted line position shown in Fig. 4. The upward movement of this head and the concurrent downward movement of the main spring 1, forces the opposite extremities of the supplemental springs 4 toward each other, and imposes an increased compression strain thereon; and this movement and action continues until the main spring and lever parts have been carried from the full line position B—B—b—b, to the dotted line position C—C—c—c, and the cross head 9 has been brought into contact with the lower face of the main spring 1. After this engagement occurs the conjoined spring-lever-system is locked against further relative movement, and any additional displacement of the spring supported parts is resisted by the positive flexure and flattening out of the main spring alone.

During the above described compressive movement the lower end of the rod 22 slides freely through the aperture in the short arm of the bell crank member 21; but as soon as the parts have returned to normal load position (B), the elements 16—17—21—22 are brought into tensioned engagement; and any rebound, or separation of the body and axle members, imposes an outward thrust on the rod and pin connections 16—17 that tends to rock the lever members 3 and 14 in a clockwise direction on their respective pivot supports 11 and 15—as shown most clearly in the diagram of Fig. 10. This action lifts the bridge member 14 out of engagement with the boss 11, and thus permits the connected lever elements to be actuated differentially in accordance with the relative resistances to their respective movements. The downward movement of the lever 3 depresses the upper extremities of the supplemental spring 4 (which are connected thereto by the bolts 10); and the upward movement of the arms 14 lifts the outer extremity of the main spring 1 more rapidly than the center of that spring is raised by the rebound of the body. The complementary and opposite movements of the supplemental spring connections, 9—10 and 6—8, (with the lever and main spring respectively) again imposes an increased compression on those secondary resilient elements; and the cooperative and conjoint reaction of the bridge lever connections with the extremity of the primary spring, also imposes and maintains a positive bending strain on that suspension element; and as a result of these concurrent or successive interactions, the rebound, or separation of the parts beyond normal load position, is accompanied and resisted by the positive or compressive flexure of all of the spring suspension members. This flexure, of both the supplemental springs 4 and the main leaf spring 1, is progressively increased as the separation of the body and axle members continues, until the parts have moved to the dotted line position E—E—e—e; after which the lever 3 is locked against further movement (by the engagement of its head, 9, with the axle); and any additional separation of the aforesaid chassis members is resisted and checked by the continued upward swing of the bridge lever 14 that carries the end of the main spring toward the position E″ (see Fig. 10) and thereby subjects that element to a greatly increased compression.

Figs. 5, 6 and 7 illustrate, in somewhat greater detail, another organization that presents the same general arrangement of parts as is shown in Figs. 4 and 10; but which differs from the construction first described in the specific character and disposition of the supplemental spring elements. In this modified embodiment of my improvements these secondary resilient members are made in the form of relatively flexible multiple leaf spring 26—27—27, which are mounted, at their inner adjacent ends, in rigid clips 29 and 30—30 that are pivotally supported on an intermediate flexible portion of the main spring 1, by means of the bracket and cross bolt connection 31—32. The outer extremity of the lower spring 26 bears directly against the lower face of the main spring 1; and the adjacent ends of the two upper springs 27—27—which are symmetrically disposed one on each side of the main spring as shown best in Fig. 7—are cross connected by a pin, 33, which engages with the upper face of the said main spring. The central portions of the single secondary leaf element 26 is provided with an elongated bearing clip 36 that is adapted to make sliding engagement with the head $9^a$ of the lever element $3^a$; and the corresponding portions of the twin leaf springs 27—27 are operatively connected with this head by means of the clips 37—37, the slotted shackle links 39—39, and the cross bolts 38 and 40. The lever $3^a$ is rockably supported on the axle perch bolt 11ᵃ; and is flexibly coupled to the end of the main spring 1 by means of the double arm bridge lever 14ᵃ and the U shaped shackle link 2; and this bridge member is coupled, in turn, to the bracket support, 29, (or, if desired, to the vehicle body) by the "one way" toggle joint connections 16ᵃ—17ᵃ—21ᵃ—22ᵃ—22ᵇ; all of the last mentioned parts being either identical with, or substantially the same as, the correspondingly numbered parts of my Fig. 1 construction.

When the parts are assembled in operative relationship the secondary resilient elements are under sufficient initial tension to maintain the parts in the normal load position shown in full lines in Figs. 5, 7, and 8; and in this position the lever system 3ᵃ—14ᵃ etc. is in double connective engagement with both of the supplemental leaf spring members, 26 and 27—27, and with the toggle joint system 16ᵃ to 22ᵃ. When the body and axle members are forced toward each other by an increased load, or by an added kinetic stress, the lever elements 3ᵃ—14ᵃ are rocked as a unit on the pivot bolt support 11ᵃ, and the head 9ᵃ is raised, thereby imposing an additional compressive stress on the lower supplemental spring 26, which is transmitted to and carried by the downwardly moving main spring. These concurrent flexures and displacements, of the resilient suspension members, may continue until the parts have moved from the full line positions, B—B—b—b, to the dotted line positions C—C—c—c, and the supplemental spring 26 has been flattened out into contact with the lower face of the main spring 1; as shown by the dotted lines in Fig. 5. After this engagement occurs the primary and secondary spring elements are locked against further relative compressive movement, and are then flexed or bent as a unit by any additional closure of the system.

During the continuance of the action last described the head 9ᵃ is out of engagement with the upper pair of supplemental springs 27—27; but the latter are maintained in tensioned engagement with the main spring by the pin 41 which prevents the upward movement of the shackle connection 39 with the head 9ᵃ. When the parts return to their initial position of static equilibrium the cross bolt 40 engages with the ends of the slotted links 39; and the connections 17ᵃ—21ᵃ—22ᵃ—22ᵇ are concurrently brought into operative conjunction. Under such conditions any rebound or separation of the vehicle members above or beyond the normal load position imposes an upward pull on the connector 22ᵃ—22ᵇ, and an outward thrust on the tubular bars 17ᵃ—17ᵃ, and rocks both of the levers 3ᵃ and 14ᵃ in a clockwise direction on their respective pivot supports 11ᵃ and 15ᵃ. The downward movement of the inner lever 3ᵃ depresses the head 9ᵃ and subjects the upper pair of supplemental springs 27—27 to an increased bending stress; and the upward movement of the outer bridge lever 14ᵃ concurrently lifts the extremity of the main spring 1 and imposes an increased positive flexure on the primary member of the combination. The mutual and conjoint reactions of the downwardly flexed supplemental springs 27 and the upwardly flexed main spring 1—and the cooperative differential action of the two elements of the lever system, 3ᵃ, 14ᵃ—maintains an automatic balance between the primary and secondary resistances of the organization to rebound movements, and thereby equalizes the strain on the several parts of the elastic suspension system as the latter is increasingly flexed by the separation of the body and axle parts. During this action the lower supplemental spring 26 is prevented from recoiling beyond its initially tensioned normal load position by the pull of the rod 22ᵃ on the inner end of the pivoted clip support 29; and the point of connection between these parts (22ᵃ and 29) may be so adjusted, if desired, as to impose some added flexure on this third supplemental spring during rebound movements; so that in this case all of the spring suspension elements are simultaneously utilized to positively restrain and check any negative recoil of the system from normal load position. When this recoil action is unusually severe, the primary and the secondary springs are flattened out until the cross bolt 38 engages with the upper face of the main spring 1—as shown in Fig. 6—and the intermediate pin 41 bears on the inner leaf of the lower supplemental spring 26. In this position of the parts—(which results in a movement of the main spring from B to E)—the inner lever 3ᵃ and the secondary springs 26—27—27 are locked against further downward reflection; but a continuation of the rebound action will rock the outer bridge lever element 14ᵃ, on its own pivot support 15ᵃ, and lift the outer ends of the main spring 1 and the supplemental springs 27—27, to a still higher position E″ (see Fig. 10).

In this organization—as in the one first described—any movement of the system in either direction from the point of static equilibrium imposes a positive flexural stress on both the primary and secondary resilient elements of the combination, and thereby progressively increases the initial tension or strain to which those elements are subjected by normal load; and in both constructions the progressively increased flexure of the supplemental springs are arrested—at predetermined points—by positive "stops" that coact with the main spring—without interfering with the continued positive bending or "straightening out" of the primary suspension member of the system. The fundamental operative characteristic of these mechanisms is the irreversible application of the kinetic stresses to the elastic support elements, in such manner that those supports—and particularly the main leaf spring—are never subjected to negative bending action that would tend to expand them beyond their initial load form and outline; but are, on the contrary, always increasingly compressed or flexed in the same direction whenever the parts move in either direction from the position of static equilibrium. And a further characteristic of these systems is that the flexural movements of the main spring are always resisted by, and balanced against, the cooperative and conjoint movements of the supplemental springs—for displacements in both directions from normal load position—so that these primary and secondary resilient members are mutually compressed against each other, and serve to mutually reinforce and stiffen each other against excessive distortion.

In order to check the natural tendency of the resilient system to oscillate about a mean position of elastic equilibrium, I preferably provide means for "damping" the free flexural movements of either one or both sets of springs, and thereby securing a more "dead beat" action of the suspension organization. In the construction shown in Fig. 4 the desired effect is obtained, in some degree, by the close frictional engagement of the interconnected portions of the divided lever system 3—14; this engagement being capable of adjustment by the tightening or loosening of the nuts on the cross bolt connections 15—16. In the construction shown in Figs. 5 to 8 the area of contact between the lever elements 3ª and 14ª is considerably increased—by the provision of the extensions 42 on the lever member 3ª—and an added restraint to any elastic oscillation of the system is secured by the peculiar functional action of the long pliable supplemental leaf springs 26 and 27—27. When the springs are flexed there is a relatively large sliding movement between their superimposed leaves; and this sliding motion is resisted by the friction between the plurality of spring engaged surfaces that are subjected to greater and greater pressure contact as the flexure increases. The frictional damping action thus produced may be augmented to any desired extent by the use of a larger number of binding clips—such as are indicated at 43 and 44—and also by corrugating the engaging surfaces of the superimposed leaves in the manner shown in the detail cross sectional view of Fig. 9.

The "damping" or retarding of the elastic flexures of the spring suspension elements diminishes the effect of the kinetic inertia, or momentum, of the oscillating parts and thus tends to reduce both the rapidity and the amplitude of the compression as well as the rebound movements of each main supplemental-spring combination. It is understood, of course, that each end of the main cross leaf spring, 1, will be provided with a lever-controlled-supplemental spring unit of the character above described; and that both of the cross leaf main springs (at the front and rear of the vehicle body) are preferably thus equipped. The "damping" and lengthening of the free period of vibration of the spring supports tends to secure a more effective synchorizing action of the separate units, at the two sides and two ends of the vehicle, and thus prevent to some extent, the side rolling or end pitching of the body that results from a differential and non-concurrent compression or rebound of those units; and the decrease in the amplitude of elastic oscillation also tends to minimize the objectionable effects that are produced by such differential actions.

Each complete cross leaf spring organization—which comprises a pair of symmetrically disposed lever-controlled-spring units like those shown in Figs. 3 to 8—also presents a kinematical combination of parts that is very effective in resisting and checking both the lateral rolling and the endwise rocking or pitching of the vehicle tonneau. Any lateral sway of the body and main spring members—away from their normal central position with respect to the longitudinal axis of the running gear—is in part restrained by the resultant shifting of the points of engagement between the supplemental springs and the longitudinally rigid lever elements (3 or 3ª); and on the rebound movement, any such sway is further effectively resisted by the resultant increase in the tension of one or both of the connector elements 22 and 10 (or 22ª and 39) as well as by the normally balanced reactions between the reversely inclined shackle link suspensions 2—2 at the opposite ends of the main spring (see Figs. 6 and 10). The longitudinal rocking or end pitching of the body tends to twist the main cross leaf spring element 1 on its longitudinal axis; and this tendency is resisted in part by the close engagement of the edges of this spring with the inner faces of the forked bridge levers 14 or 14ª, and in part by the symmetrical disposition of the twin supplemental springs (4—4 or 27—27) on the opposite edges of the main spring.

Figs. 11, 12, 13 and 14 illustrate another embodiment of my invention, as applied to a front cross leaf spring support for a Ford type of car. In this exemplification of my improvements each supplemental spring 4ᵇ is mounted in a closed cell, which consists of a cup 45 that is secured at its upper end to the flanged bracket 6ᵇ, and a cap 46 that slides longitudinally in the cup 45, and is provided with an enlarged head 47 that engages with the inturned flange on the bracket support for the cup. These supplemental spring units are preferably arranged in pairs, symmetrically disposed one on each side of the main spring; and are supported on an intermediate flexible portion thereof by the bracket clip 6ᵇ (see Figs. 13 and 14). Each cell is provided with a sliding piston 48 that moves freely in the cup 45 and is coupled to the inner extremity of a double arm lever 3ᵇ by means of the "one way" bolt and stirrup connections 49—50 and cross bolt 51. The outer ends of the lever arms 3ᵇ—3ᵇ are mounted on the shouldered extremities of the axle perch bolt 11ᵇ, which also serves as a pivot support for the forked bridge lever 14ᵇ; and the latter member is coupled at its outer end to the adjacent extremity of the main spring 1 by means of the U-shaped shackle link 2ᵇ. The main lever 3ᵇ is also provided with a cross bolt 53, that is operatively connected to an intermediate part of the link 2ᵇ by the rectangular frame 54 and the pintle pin 55. The side arms of the frame 54 are apertured or notched to receive the lower cross bar 56 of the stirrup bolt 57; and the latter is coupled at its upper end to a bell crank bracket 58 on the body frame of the vehicle.

The operation of the last described construction is as follows: When the parts are in the normal load position shown in Fig. 11, the supplemental springs 4ᵇ are confined under a predetermined initial tension within the expanded cells 45—46; and the lower edges of the actuating lever 3ᵇ are held in pressure engagement with the overlapping portions 60 of the bridge lever 14ᵇ. When the system is subjected to an increased kinetic stress—and the main spring and axle members are forced toward each other—the engaged lever elements 3ᵇ—14ᵇ are rotated as a unit, in a counter-clockwise direction, on the axle perch support 11ᵇ. This movement lifts the inner ends of the actuating lever, and the connections 50—49, and further compresses the supplemental springs between the upwardly moving heads 48 and the downwardly moving cap and clip parts 45—6ᵇ that are now held in fixed relation to the main spring 1. This action continues until the parts have moved from the positions B—b (as shown in full lines in Fig. 11 and as indicated in part in dotted lines in Figs. 12, 13 and 15) to the positions C—c (as shown in full lines in Fig. 12 and indicated in part by dotted lines in Figs. 13 and 15); and it is then arrested by the engagement of the head 48 with the lower end of the cap 46 (as shown in section in Fig. 12); and after this occurs any further compression of the system is resisted and checked by the continued positive flexure of the reinforced main spring element 1.

During the closing movement of the spring suspended parts the system of connections 53—54—55—56—57—58 is inoperative or idle—because of the free and upward movement of the bracket 58—but when the members have returned to normal load position (Fig. 11) the lower arm of the bracket 58 is engaged by the body frame; and any rebound or abnormal separation of the body and axle parts imposes an upward pull on the stirrup bolt 56—57 and on the cross frame 54, which tends to lift the link 2ᵇ and the outer ends of the lever 14ᵇ and the main spring 1; and thus again subject the last named element to a positive bending stress. But this action is necessarily accompanied by a reactive inward pressure of the frame 54 against the cross bolt 53, which tends to impart a differential clockwise movement to the inner lever element 3ᵇ; and this latter action depresses the heads of the stirrup link connections 50; and thus again compresses the supplemental springs 4ᵇ between the downwardly moving caps 46 and the reversely moving parts 48—45 that are now fixed relatively to the main spring clip 6ᵇ. These differential and interbalanced flexures of the primary and secondary springs may be made to progressively increase in varying predetermined ratios—(when rebound movements occur)—by altering the kinematic relation between the pivot pin connections 11ᵇ—53—55—56, and changing the length of the rods 57 etc.; but when the parts have been carried to the full positions E—e, (shown in full lines in Figs. 13 and 14 and also indicated in the diagram of Fig. 15) the compression of the supplemental springs 4ᵇ is arrested by the engagement of the head 47 with the piston 48 at the bottom of the cup 45 (e. g., see Fig. 17); and when this occurs any further rebound movement is resisted by the greatly increased positive flexure of the main spring alone—which results from the upward swing of the frame 54 on the locked lever pivot bolt 53 and the resultant lifting of the shackle link 2ᵇ to the position E″.

Figs. 16 and 17 illustrate a construction very similar to that shown in Figs. 11 to 15 inclusive. In this fourth exemplification of my invention there is a main side leaf spring 1ˢ, and two supplemental springs 4ᶜ symmetrically disposed, one on each side of the main spring, and mounted thereon in closed cell supports (comprising the clip connected cups 6ᶜ—45ᶜ and the caps 46ᶜ) in the manner previously described (see also Figs. 13 and 14). The ends of the enclosed springs 4ᶜ are operatively connected with the inner extremities of the actuating lever arms $3^c$—$3^c$ by means of the heads $9^c$, $9^c$—which are adapted to engage with the ends of the caps $46^c$—and the bolt and stirrup link connections $49^c$—$50^c$ that are engaged at their lower ends with the sliding piston heads $48^c$. The outer extremities of the arms $3^c$—$3^c$ are riveted or otherwise suitably secured to the forked shoe or bracket 61 which is pivotally supported on the hanger bolt $11^c$, and is provided with a pintle bolt $15^c$ that carries the elbow portion of a bell-crank bridge lever $14^c$. The outer end of this lever is coupled to the extremity of the main spring $1^s$ by means of the U shaped shackle link $2^c$; and the inner end thereof is connected to the relatively movable vehicle members (e. g., the body and axle parts) by the pair of parallel links $17^c$ and the toggle links $21^c$ and $22^c$.

The kinematical action of the organization just described is generically analogous to that of the construction shown in Figs. 4 to 8. When the parts are in normal load position B—b (as indicated in dotted lines in Fig. 16) the upper edge of the bridge block $14^c$ is in engagement with the adjacent face of the shoe block 61; and any increase of load stress—which results in a closing movement of the system—rocks the engaged lever elements $3^c$—61—$14^c$ as a unit on the hanger bolt $11^c$ and carries the parts toward the position C—c (shown in full lines in Fig. 17 and partly indicated in dotted lines in Fig. 16). This movement results in a joint compression, or positive flexure, of the main leaf spring $1^s$ and the supplemental springs $4^c$; and the tension on, and in, these elements is progressively increased until the lower ends $47^c$, of the caps $46^c$, come into engagement with the heads $48^c$ at the bottom of the cups $45^c$. During this movement the toggle link elements $21^c$—$22^c$ assume the position shown at the right of Fig. 17; but this imposes no tension on the connectors $17^c$ because of the lost motion between the slotted end of the link $22^c$ and its pintle bolt coupling to the adjacent elements of the linkage. But when the parts return to, and rebound beyond, the loci of static equilibrium the straightening out of the toggle links $21^c$—$22^c$ exerts an inwardly directed pull on the connectors $17^c$ and the pintle pin $16^c$, which tends to conjointly rock the bridge lever $14^c$ downwardly (on the pivot bolt support $15^c$) and the inner lever $3^c$ upwardly on the main hanger bolt $11^c$. The counter-clockwise downward movement of the bridge member $14^c$ imposes an increased positive bending stress and flexure on the main leaf spring $1^s$; and the cooperative upward movement of the lever arms $3^c$—$3^c$ lifts the heads $48^c$ and subjects the supplemental springs $4^c$ to an increased compression against the relatively fixed caps $46^c$. This last described action continues until the heads $48^c$ are brought into contact with the interengaged ends of the cups and caps, $45^c$—$46^c$—$47^c$, (as shown in the full line positions E—e of Fig. 16); and when this occurs any further separation of the body and axle parts rocks the bridge block $14^c$ on a relatively fixed pivot support $15^c$, and carries the parts to the dotted line positions E''—E'' of Fig. 17, thus greatly increasing the positive bending or compression of the main spring alone. If the rebound is so abnormal and excessive as to bring the links $21^c$—$22^c$ into longitudinal alignment (as indicated in dotted lines in Fig. 17) the further separation of the spring supported members—and the further abnormal and dangerous flexure of the primary suspension element—is positively arrested by the links themselves, which thus serve to guard and protect the static system against undue distortion.

In the two illustrative embodiments of my invention, which are depicted in Figs. 11 to 15 and 16—17 respectively, the "damping" of the elastic oscillations of the spring system is effected by utilizing the supplemental spring cells (45—46 or $45^c$—$46^c$) as elements of a fluid check mechanism which is actuated in one direction by liquid pressure and in the other direction by pneumatic pressure. Each of the caps, 46 and $46^c$, is provided with a simple spring pressed valve 62 (which is shown only in the enlarged view of Fig. 16) that opens outwardly; and each of the piston heads $48^c$ is provided with apertures 63 that are covered by the downwardly movable flap valves 64. The cups $45^c$ are filled with a heavy viscous oil, or other suitable liquid, to the normal level of the cap heads $47^c$ (when the parts are in the position of static equilibrium). When the pistons $48^c$ are lifted, the valves 64 allow this liquid to pass freely through the apertures 63 and remain in the bottom of the cups $45^c$ (as shown in Figs. 12 and 16); and on the reverse movement of the parts the valves 64 are tightly closed and the descent of the pistons—which controls the recoil or expansion movements of the compressed springs—is restrained and checked by the relatively slow and predetermined leakage of the oil past the edges of the piston heads. When the springs ($4^b$ or $4^c$) are compressed from the opposite ends (by the downward movement of the caps 46 or $46^c$) the valves 62 open to permit of the free escape of air from the upper ends of the cells but when the recoil movement begins these valves close, and the expansion of the cells, and of the springs, is then resisted by the partial vacuum created in the interior of the caps and the resultant increase in the external air pressure on their upper ends. In such a construction as that shown in Figs. 16—17, nearly all of the air above the level of the oil in the cups 45$^c$, will be expelled during the downward movement of the caps 46$^c$ (see cross-section of Fig. 17); and the only air which can enter these caps on the upward movement is that which will leak in through the small clearance space around the rods 49$^c$. Under such circumstances the differences between the inner and outer air pressures may amount to 10 lbs. per sq. in. or more; and if the diameter of each of the two caps is only three inches, the aggregate restraining pressure tending to prevent rapid recoil of the springs 4$^c$ may amount to nearly one hundred and fifty pounds. With a ratio of lever-conjoined-spring movements, such as may be readily used in the construction under consideration a restraint pressure of one hundred and fifty pounds on each supplemental spring unit may represent a damping resistance of one thousand pounds, or more, to the free oscillation of the main spring and body parts; and this is amply sufficient to effectively check any rapid or free period vibrations of the heaviest vehicles under the most severe shocks of road travel.

The operative relationship of the parts of the organization shown in Figs. 11 to 14 also presents an effective means for restraining both the side sway, or "rolling", and the end rocking, or "pitching", of the vehicle tonneau. The first mentioned movements are continuously resisted and checked by the reversely inclined and oppositely balanced thrust pressures of the supplemental spring elements 4$^b$ against the two side or end portions of the main cross leaf spring 1; and are also controlled—during rebound action—by the diagonally directed reactive pulls of the rods, or links 57—57 on the opposite sides of the vehicle body. The longitudinal rocking or pitching movements—which tend to twist the main cross leaf springs on their longitudinal axes—are restrained, as before, by the engagement of the side faces of the main spring, and of the shackle link 2$^b$, with the rigid hollow bridge frame 54 and its supports; and also by the balanced pressures of the twin secondary springs 4$^b$ on the opposite edges of the primary resilient element.

In the construction shown in Figs. 16 and 17 the interconnected spring and lever elements are braced against relative lateral displacement—and against the longitudinal or axial twisting of the side leaf main spring which accompanies lateral rolling of the vehicle body—by the mounting of the lever suspension elements 14$^c$—2$^c$ etc. between the rigid side walls of the pivoted block 61, and by the symmetrical positioning of the twin supplemental spring units on the opposite edges of the main spring member 1$^s$; and the endwise sway of the tonneau on its elastic supports is also restrained, to some degree, by the cross connections between the ends of the arms 3$^c$ and the spring cell mountings on the main spring (when the parts are strongly compressed as shown in Fig. 17), and by the longitudinal tension imposed on the links 17$^c$, when the parts rebound above normal load position.

In the organization shown in Figs. 18, 19 and 20 each of the supplemental spring elements is made up of two counteracting volute coils 4$^d$—4$^x$, which are mounted base to base on an intermediate clip support 6$^d$ that is suitably secured to the main cross leaf spring 1. These composite elements are preferably arranged in pairs—one on each side of the main spring as shown in Fig. 20—and are actuated by a double arm lever 3$^d$, which is engaged with the upper coils 4$^d$—4$^d$ through the intervention of a cross head 51$^d$ and a common follower plate 65, and is connected to the lower coils by means of the "one way" bolt and stirrup link couplings 49$^d$—50$^d$ and the individual follower plates 66—66. All of the secondary coils, 4$^d$—4$^d$ and 4$^x$—4$^x$, are held under a predetermined initial tension—and are prevented from expanding beyond the normal load position shown in Fig. 18—by the stop bolt 67 (which engages at its opposite ends with the clip 6$^d$ and the upper follower plate 65—see Fig. 19), and by the stirrup bolts 50$^d$ which are secured at their lower ends to the plates 66, and are provided at their other extremities with elongated heads 68 that are engaged both by the lower ends of the bolts 49$^d$ and by the upper face of the spring bracket support 6$^d$ (see Fig. 18). The side arms of the lever 3$^d$ are held in proper spaced relationship by means of the cross head connections 51$^d$—69 and the shouldered ends of the axle perch bolt 11$^d$, on which this rocking member is mounted; and a second "U shaped" bridge lever 14$^d$ is flexibly secured to these arms by the cross bolt 15$^d$ and the nut and washer connections 70—71 (see Figs. 19 and 20). The outer extremity of the bridge member 14$^d$ is coupled to the end of the main spring 1 by the forked shackle link 2$^d$; and the upper side edges of this auxiliary lever element are provided with segmental grooves 72—72 that are adapted to receive a pair of flexible connectors 73—73, which are secured at their outer ends to the said lever, and are connected at their opposite extremities with the relatively movable axle and body members by the guide pulley 74 and the adjustable eye block 75.

The general mode of operation of the last described embodiment of my invention is substantially the same as that which characterizes the previously described exemplifications thereof. When the parts are in normal load position (Fig. 18) the cross bar, 60$^d$, of the U shaped bridge lever 14$^d$, is in engagement with the arms of the lever member $3^d$; and the head, $51^d$, of the latter is operatively connected to the opposite extremities of both sets of the initially tensioned supplemental springs $4^d$ and $4^x$. When the body and axle parts are forced toward each other, by an increased kinetic load or compressive shock, the lever system, $3^d$—$14^d$, etc., is rocked as a unit on the axle perch bolt $15^d$; and the head $51^d$ is lifted, thereby raising the lower follower plates 66 and compressing the supplemental springs $4^x$—$4^x$ against the oppositely moving main spring clip support $6^d$. This compression of the lower secondary springs is progressively increased as the parts move from the positions B—$b$ (shown in full lines in Fig. 18 and partially indicated in the dotted and diagram lines of Figs. 19 and 21) to the positions C—$c$ (see Figs. 19 and 21); but is arrested when the edge of the cross rib $60^d$ engages with the lower side of the depressed main spring; and after this occurs any further closure of the system is resisted by a flexural bending of the main spring alone. When the parts rebound above the position of static equilibrium, the resultant separation of the body and axle members, 74 and 75, imposes an inwardly directed pull on the flexible connectors 73—73 which tends to impart a differential clockwise rotation to the two lever elements $3^d$ and $14^d$ (see Fig. 21); and thus move the said elements toward the positions E—$e$ (shown in full lines in Fig. 19 and in diagram in Fig. 21). The clockwise swing of the lever $14^d$— on its pivot support $15^d$—lifts the outer end of the main spring 1 and thereby imposes an increased flexural strain thereon; and the concurrent or cooperative movement of the lever $3^d$ (on its pivot bolt $11^d$) depresses the head $51^d$ and thereby compresses the supplemental springs $4^d$ against the upwardly moving main spring bracket $6^d$. This movement is ultimately arrested by the engagement of the central part of the follower plate 65 with the upper face of the clip $6^d$; after which the secondary spring-lever system, $3^d$—$4^d$, is locked in position relatively to the primary suspension element; and any further separation of the body and axle parts is resisted by the continued upward swing of the bridge and shackle link connections $14^d$—$2^d$ toward the position E″ (see Fig. 21), and the resultant rapid increase in the positive bending strain imposed on the outer portions of the main leaf spring.

The construction shown in Figs. 18 to 21 is not provided with any means for "damping" or retarding the free elastic oscillations of the system; and in that respect it fails to present all of the specific characteristics of the previously described embodiments of my invention. This construction does, however, present a kinematical combination of parts which will effectively resist both side sway and longitudinal twisting of the cross leaf main spring, and which will therefore, to that extent, restrain the lateral rolling and the end pitching of the vehicle body on its elastic supports.

Figs. 22 and 23 illustrate another exemplification of my present improvements, which possess certain specific features of advantage that have not been heretofore described. In this exemplification each supplemental spring unit comprises two conical or volute coils $4^e$—$4^e$ which are supported—one on each side of the main cross leaf spring 1—by a hanging bracket clip $6^e$ that is attached to an intermediate flexible portion of the primary spring by the cross bolts 77—77. The upper ends of these secondary coils are engaged by the head of the twin arm lever frame $3^e$, which is pivotally mounted at an intermediate point in its length on the axle perch bolt $11^e$, and is coupled at its outer end, (at $15^e$) to the auxiliary bridge lever $14^e$. The member $14^e$ is connected to the extremity of the main spring 1 by the shackle links $2^e$; and is also connected, at a point near its pivot support $15^e$, to the body of the vehicle by the spherical headed bolt $57^e$, the adjustable stirrup coupling 78, and the semi-resilient bracket $58^e$.

The action of the organization shown in Figs. 22 and 23 is diagrammatically illustrated in Fig. 24. When the parts are in the normal load position (Fig. 22) the lower edge of the bridge lever $14^e$ rests on the pivot bolt support, $11^e$, of the lever $3^e$; and when the system is subjected to an increased kinetic compression stress, the relative approach of the main spring and axle members rocks the lever assembly ($3^e$—$14^e$ etc.) as a unit on the cross bolt $11^e$, thereby depressing the lever $3^e$ and compressing the secondary coils $4^e$ against their bracket support $6^e$. This movement continues until the cross head of the lever $3^e$ comes into engagement with the upper face of the main spring 1 (between the clip bolts 77—77); and after this occurs the progressively increased compression of the supplemental springs is arrested, and any further approach of the body and axle parts is resisted by the continued positive flexure of the main spring alone. During this closing movement of the system the connection, $57^e$—$58^e$ etc., is inactive; but when the members return to the normal position of static equilibrium, the various parts of that connection are brought into tensioned engagement; and any rebound or separation of the members above or beyond the normal load position imposes an upward pull on the bridge lever $14^e$ that is communicated in part to the main spring (through the shackle links $2^e$—$2^e$), and in part to the outer extremity of the lever $3^e$ (through the cross bolt connection 15e). This concurrent or conjoint action on the parts 14e, 2e and 3e produces a differential rotation of the two lever elements in opposite directions—the lever 14e being rocked in a counter-clockwise direction on its pivot bolt 15e, and the lever 3e being rocked in a clockwise direction on the axle perch support 11e—and these respective movements lift the end of the main spring (from position B to position E) and compress the secondary springs against the upwardly moving main spring clip 6e. The downward, or clockwise, swing of the lever 3e, and the concurrent and progressive compression of the springs 4e, is arrested as soon as the head of this lever engages with the upwardly moving main spring (at position E—e); and any continuation of the rebound movement is thereafter restrained by the independent upward swing of the lever 14e (on the relatively fixed point 15e) which carries the main spring to position E″, and thus imposes a rapidly increased flexural strain thereon.

The generic features of the last described construction are the same as those which characterize the organization shown in Figs. 4 to 21 inclusive. But the structural form and the specific functional action of the system shown in Figs. 22 to 24 differ from the corresponding features of the preceding exemplifications of my improvements in having the conjoined lever elements so arranged, relatively to each other and to the main spring and body connections, that the supplemental springs are compressed in the same direction—i. e., downwardly—whenever the main spring moves in either direction (viz, up or down) with respect to the axle member. As a result of this arrangement the flexural motion of the secondary springs 4e—4e follows the cooperative bending movement of the main spring when the system is compressed—and thus tends to accelerate or increase the downward movement of the main spring during such compression—and only opposes the movement of the primary resilient element when the body and axle parts rebound above or beyond the normal load position. The possible range of the angular movement, b—c, of the lever 3e, during compression of the system, is therefore considerably greater than the angular range b—c of this same lever during rebound; and the kinematical combination shown in Figs. 22 to 24 is, to that extent, not as effective, in quickly neutralizing the effect of compressive shocks, as are the combinations shown in Figs. 4 to 21. On the other hand the construction last described is a very simple and compact one; and it is, for that reason, particularly well adapted for use on low priced cars, or on closely built chassis frames, when the space available for the spring suspension system is very limited.

Fig. 25 illustrates a construction which is designed for use on a side leaf spring suspension, and which is, in many respects, substantially identical with that shown in Figs. 22 to 24. In this exemplification of my improvements the supplemental spring member comprises a pair of helical expansion coils 4f (only one of which is shown in the sectional elevation) that are flexibly secured at their upper ends to the side bar 80 of the vehicle body, and are connected at their opposite extremities to the inner ends of a forked, or two armed, lever 3f; and the latter member is rotatably mounted, on the main hanger bolt 11f, between the depending sides of a U shaped body bracket 81. An auxiliary bridge lever, 14f, is pivoted, at 15f, to an intermediate part of the lever arms 3f, and is coupled at its outer end, (by the solid shackle link 2f), to an extension bracket 82 that is bolted to the extremity of the main side leaf spring 1s. The bridge lever 14f is also coupled to the axle member of the vehicle by means of the adjustable link and spring bracket connections 56f—57f—58f.

The cooperative action of the interconnected lever-actuated-spring elements of this organization is substantially the same as that of the analogous combination shown in Figs. 22 and 23, and the successive relative positions of the parts are indicated, in both cases, by the diagram of Fig. 24. When the parts are in normal load position—as shown in full lines in Fig. 25—the edge of the bridge lever 14f is in pressure engagement with the cross bolt 11f, and the springs 4f are then under sufficient initial tension to balance the upward thrust on the main spring shackle connections 82—2f. When the body and axle members are forced toward each other, by a kinetic increase in load stress, the connected lever elements, 3f—14f, are rotated clockwise, as a unit, on the cross bolt 11f (thus moving the lever system from position, b, to or toward the dotted line positions c—c); and the secondary springs 4f—4f are subjected to a progressively increased tension that is balanced against, and coacts with, the corresponding increase in bending strain in the main spring 1s. When the parts rebound above the normal load position the connections, 56f—58f, are brought into semi-elastic tensioned engagement to exert a downward pull on the lever 14f; and this movement is transmitted, in part to the lever 3f—to again rock this element toward the dotted line position C, and correspondingly expand the springs 4f—and in part to the shackle link 2f, to thereby depress the end of the main spring toward the dotted line positions E—e, and thus subject the primary suspension element to a cooperative increase in flexural stress. In both of these movements (of closure or of rebound) the downward swing of the lever 3ᶠ is arrested, at substantially the same point in its arc of motion, by the engagement of the spacer bolt member 83 either with the face of the main spring 1ˢ, or with the edges of the tensioned stirrup links 57ᶠ. When this engagement occurs the lever-supplemental-spring system is locked in position with respect to the main spring; and any further displacement of the body and axle members is resisted and restrained by the progressively increased bending strain in the main spring alone.

Both of the last described organizations (shown in Figs. 22 to 25 inclusive) present a kinematical assemblage of connective elements that is effective in restraining both longitudinal and lateral displacements of the body with respect to the axle member of the chassis frame. In the case of cross leaf spring suspensions each end of the main spring will be provided with a supplemental-spring-lever combination like that shown at the left of Fig. 22; and in the case of side leaf spring suspensions the opposite or opposing ends of the front and rear springs are connected to the body by the lever-link-spring mechanism illustrated in Fig. 25. When the parts of either of these suspension systems are subjected to rebound stresses the body of the vehicle is held in centered and balanced relation with respect to the axle supports by the symmetrical action of the reversely inclined tension connections 57ᵉ or 57ᶠ at the opposite sides or the opposite ends of the chassis frame; and an added degree of transverse stability is imparted to main spring elements either by the balanced pressure of the two supplemental springs 4ᵉ on the opposite edges thereof, or by the close sliding arrangement of the tensioned stirrup links 57ᶠ with those edges. In the case of compressive movements these restraints to lateral sway or displacement of the spring connected parts are less effective—and in that respect the systems of Figs. 22 to 25, are somewhat inferior to those illustrated in Figs. 4 to 21 inclusive—but there is less necessity of guarding against rocking and pitching actions when the body and axle parts are pressed together than when they are thrown apart by rebound stresses.

The constructions shown in Figs. 26 to 34 inclusive, represent another species of organization that may be employed in applying my invention to either cross leaf or side leaf spring suspensions. In these embodiments of my improvements I dispense with any separate bridge lever element (such as the one indicated by the lettered numerals 14 to 14ᶠ); and substitute therefor a shifting fulcrum support for one of the other elements of the lever-actuated-supplemental-spring combination. The basic operative features of this second species of organization are substantially the same as those which characterize the various structural combination shown on the first three sheets of my drawings; but it also presents certain individual features of construction and operation which will now be considered in detail.

In the arrangement shown in Figs. 26 to 29 inclusive, the secondary resilient element of the suspension is made in the form of a single supplemental leaf spring 4ᵍ which rests, at its inner end, on the central portion of the main spring 1, and is supported, at its outer end, in a bracket clip 84; and this bracket member is pivotally mounted at 85, on the extremity of a double arm lever 86, and is coupled to the end of the main spring by the shackle links 2ᵍ—2ᵍ.

The lever member 86 is rotatably supported on the axle perch bolt 11ᵍ; and the side arms thereof are held in suitable spaced relationship (by the spacer connections 56ᵍ—83ᵍ, and the shouldered ends of the cross bolts 11ᵍ and 85) to engage closely with the guide block 87 that is bolted to the axle at the point just above its connection with the radius rod 88. The intermediate part of the lever is coupled, at 56ᵍ, to the body of the vehicle, by the "one way" bolt and stirrup link connections 57ᵍ. The operation of this mechanism is as follows: When the parts are in the normal load position shown in Fig. 26, the spacer bolt 83ᵍ, of the lever 86, rests on the axle; and when the body and axle members are forced toward each other, the bracket 84 is rocked downwardly on the relatively fixed pivot bolt 85, and a progressively increased bending strain is thus concurrently imposed on both the main spring 1 and the secondary spring 4ᵍ. This movement continues until the parts have moved from position B-b to position C-c (see Figs. 26 and 29); or until the supplemental spring, 4ᵍ, has been flattened out into pressure engagement with the adjacent portions of the main spring 1; after which the two superimposed suspension elements act as one reinforced and stiffened spring to strongly resist any further approach of the body and axle members. During this closing or compression action of the system the lever 86 remains fixed in position on the axle supports; and the sliding bolt and stirrup link connection 57ᵍ is inactive. But when the parts rebound above the normal load position B, the separation of spring connected chassis members imposes a pull on the "one way" connector between the body and the lever, 86, and rotates the latter, in a clockwise direction, on the axle perch bolt 11ᵍ. This movement lifts the pivot support, 85, of the spring bracket 84, and thereby again increases the positive flexure of both the secondary and the primary springs $4^g$ and 1; and ultimately carries the interconnected parts to the position E—e, shown in full lines in Fig. 27 and also diagrammatically indicated in Fig. 29. In this position the adjacent parts of the two leaf springs are again brought into interlocked pressure engagement; and then act as a unit, to restrain any further separation of the body and axle members.

In this construction the elastic oscillations of the resilient suspension members are "damped" by the sliding frictional engagement between the superimposed leaves of the long pliable supplemental spring $4^g$; and this damping action can be increased, as desired, by the use of a larger number of binding clips, $44^g$ etc., or by corrugating the engaging surfaces of the leaf elements as shown in Fig. 9. During rebound movements this frictional restraint is further increased by the sliding engagement of the inner faces of the lever arms, 86, with the surfaces of the guide block 87; and this effect can be varied, at will, by suitable adjustment of the cross bolt connections $11^g$, $56^g$, $83^g$ and 85, or by the interposition of fibre linings between the adjacent faces of the lever arms and the block. The inwardly directed pressures of the two supplemental leaf springs, on the opposite sides of the vehicle, against the convex upper surface of the main cross leaf spring, presents a very effective resistance to any lateral swing or transverse rolling of the body; and this restraint is further supplemented—during rebound movements when it is most necessary—by the symmetrically and reversely inclined tensions in the connections, $57^g$—86—$11^g$, between the opposite ends of the axle and the adjacent sides of the tonneau frame. In the particular arrangement of parts illustrated in Figs. 26 to 28 there is no special means for preventing axial twisting of the main suspension spring—which is produced by, or results from, the longitudinal pitching of the vehicle body—but this effect is resisted to some extent, on extreme movements of the parts, by the extended contact engagement between the adjoining portions of the primary and secondary spring members; and the restraint under consideration, may be rendered very effective by making each supplemental spring $4^g$ in two parts, that are symmetrically disposed on the opposite edges of the main spring, and are joined together at various points by clips and cross bolts, in the manner illustrated in the upper portion of Figs. 5, 6 and 7 (i. e., like the twin spring elements 27—27—33—37—38 etc.).

The organization shown in Fig. 30 is of the same species as that shown in Figs. 26 to 29, and differs therefrom only in certain details of structural form. In this ninth illustrative embodiment of my invention the supplemental spring element comprises a single volute or "beehive" coil $4^h$, the boss of which is mounted in a recessed block 90 that is bolted to the side bar of the tonneau frame. The lower end of this secondary coil is operatively connected to the inner extremity of the forked bracket lever $84^h$, through the intervention of the follower plate $65^h$ and the cross (spacer) bolt $51^h$. The lever frame $84^h$ is coupled to the end of the main side leaf spring $1^s$ by means of the U shaped shackle link $2^h$; and is pivotally supported at its outer extremity on the pintle bolt $85^h$. The pivot support $85^h$ is carried by a second lever $86^h$, which is rotatably mounted on the hanger bolt $11^h$ of the block 90, and which is guided in its angular movement by the stirrup frame $87^h$ that is also bolted to the side bar of the vehicle tonneau. The intermediate portion of the lever $86^h$ is connected to a semi-resilient axle bracket $58^h$, by means of the cross bolt $56^h$ and the links $57^h$—$57^h$ that are closely engaged on their opposite sides by the adjacent edges and faces of the main spring $1^s$ and the double arm lever $84^h$.

The cooperative action of the lever-controlled-spring elements of this last described organization is substantially the same as that of the system shown in Figs. 26 to 29, and it may therefore be very briefly described by stating: First, that a compressive stress will rock the lever frame $84^h$ upwardly, on the relatively fixed fulcrum support $85^h$, and thereby subject the supplemental spring to a progressively increasing compression, which will be arrested when the parts have been moved from the full line positions, B—b, to the dotted line positions C—c, and the upper edges of the lever frame $84^h$ have come into engagement with the lower end of the stirrup guide block $87^h$; second, that an expansion or rebound of the system—beyond normal load position—will bring the connections $57^h$—$58^h$ into operation and rock the lever $86^h$ downwardly on its pivot support $11^h$, thereby subjecting the main leaf spring to an increased bending stress and reactively imposing an increased compression on the supplemental spring $4^h$; and that this action will continue until the parts have moved to the lowermost dotted line positions E—e, and the lever $86^h$ has come into contact with the lower cross bar of the stirrup frame $87^h$; and third, that the elastic oscillations of the system may be frictionally "damped" by the sliding engagement between the contacting faces and edges of the elements $86^h$—$87^h$ and $57^h$—$84^h$—$1^s$. If the opposite ends of the front and rear members, of a side leaf spring suspension, are each provided with a supplemental lever-controlled-spring unit like that shown in Fig. 30, the reversely inclined connector elements, 57ʰ, of these units will also act to restrain and check longitudinal rocking or pitching of the body when the latter rebounds or moves away from its axle supports.

Figs. 31 and 32 illustrate a modified type of the species of organization that is shown in Figs. 26 to 30 inclusive. In this type of my improved shock absorber construction the extremity of the main spring 1 is suspended directly from one end of a supplemental spring element 4ⁱ by means of the cup shaped follower plate 65ⁱ and the long shackle links 2ⁱ. The opposite extremities of the secondary coils 4ⁱ are supported on the outer end of a U shaped lever frame 86ⁱ, which is pivotally supported, at its inner end, on the axle perch bolt 11ⁱ, and is coupled, at an intermediate point of its length, to the body of the vehicle by means of the cross bolt 56ⁱ and "one way" bolt and stirrup link connections 57ⁱ. A channel bracket 87ⁱ is bolted to the brake drum of the rear axle—in place of the usual shackle link bracket at that point—and serves to guide, and if desired also frictionally restrain, the arcuate movement of the lever frame 86ⁱ on the pivot support 11ⁱ.

The operation of this last described system is as follows: When the parts are in the position of static equilibrium (as indicated by the dotted lines, B—b, of Figs. 31 and 32) the outer end of the lever frame 86ⁱ rests on the lower shoulder of the guide bracket 87ⁱ and the normal bending strain in the main spring is transmitted to and carried by the initially tensioned supplemental coils 4ⁱ. When the body and axle parts are forced toward each other, by an increased kinetic load, or compressive shock, the secondary springs are further compressed against their relatively stationary lever support, and the parts assume the positions (C—c) shown in full lines in Fig. 31;—this progressive compression of the supplemental resilient element being arrested when the main spring comes into engagement with the cross (spacer) bolt 56ⁱ, and is thus prevented from further bodily movement toward the axle supports. After this engagement the part of the main spring between the bolt supports 56ⁱ (on the two sides of the vehicle) acts alone, as a shortened and greatly stiffened leaf spring, to resist and restrain any further closing of the system. When the members return to, and rebound above the normal load position (B—b) the ends of the bolt and link connections 57ⁱ are brought into tensioned engagement; and the lever frames 86ⁱ are lifted toward the full line positions E—e of Fig. 32; thereby imposing a directly balanced and progressively increased stress and strain on both the primary and the secondary springs, 1 and 4ⁱ;—and this progressively increased flexure, of the two interconnected resilient suspension elements, continues until the supplemental spring coils are compressed sufficiently to bring the central stud 91 of the lever support into contact with the follower plate 65ⁱ, after which the further upward swing of the lever, 86ⁱ, is only effective in producing a continued positive bending of the main spring alone. There is no damping restraint imposed on the elastic oscillations of this system during compressive or closing movements of the relatively movable body and axle members; but in the rebound or expansion movements thereof the free period and free amplitude of such oscillations may, if desired, be frictionally retarded by a close sliding engagement between the outer heads of the rocking lever frames 86ⁱ and the channeled guide brackets 87ⁱ, which may, in such cases, be faced with fibre or leather suitable liners for increasing the frictional resistance. When the parts are under compressive stress the lateral sway, or transverse rolling of the vehicle body, is resisted by the symmetrically, and oppositely, inclined lines of pressure engagement between the two ends of the main spring 1 and the parts of the obliquely disposed lever frames that are engaged, either directly or indirectly, therewith; and when the members rebound, above normal load position, the tonneau and axle parts are held against relative lateral displacements by the symmetrical tensions imposed on the opposite sides of the vehicle body by the connections 57ⁱ. The only provision for checking transverse or axial twisting of the main spring—and thus resisting longitudinal pitching—is that afforded by the engagement between the opposite edges of the said spring and the adjacent side arms of the lever frames 86ⁱ.

Figs. 33 and 34 illustrate an application of the form of construction shown in Figs. 31 and 32 to a side leaf spring suspension. In this embodiment of my improvements the supplemental spring element comprises two helical coils 4ᵏ—4ᵏ, which are supported, one on each side of the main spring 1ᵏ, by an inverted T-shaped hanger bracket 92 that is pivotally connected, at its upper forked extremity, with the end eye of the said main spring. The upper ends of the secondary springs 4ᵏ are mounted in the recessed heads of a follower block 93, which is provided with an elongated collar bearing that slides longitudinally on the leg of the T shaped bracket 92. The heads of this follower block are engaged by the outer forked ends 94—94 of the double arm lever frame 86ᵏ, which is pivotally mounted, at an intermediate point in its length on the main spring clip bolt 11ᵏ, and is coupled, at its other end, to the body of the vehicle by the flexible connector 57ᵏ. In the normal load position of the parts (shown in full lines in Fig. 33) the members 93 and 94 are maintained in pressure contact with the inner forked heads, 95—95, of a U-shaped bracket 96, that is bolted rigidly to the end of a scroll spring support 97; and each of the heads 95 is preferably provided with an auxiliary guide rod 98 which extends downwardly through cooperating collar bearings in the relatively movable supplemental spring supports 92 and 93, and assists in maintaining those parts in proper axial alignment. When the system is subjected to an increased kinetic load stress, the body and axle parts approach each other and the bracket support 92 is lifted toward the heads 95; and the supplemental springs $4^k$—$4^k$ are thereby compressed against the relatively fixed upper follower plate and lever members 93—94. This secondary spring compression gradually increases—in conformity with the corresponding positive flexure of the main spring $1^s$—until the central collar on the block 93 and the lower head of the hanger 92 are brought into contact with each other; after which the interengaged elements 92—93, 94—95 act as a solid or nonresilient shackle link connection between the end of the main spring and the scroll support 97, and any further approach of the relatively movable chassis members is resisted and restrained by the continued flexure of the main spring alone. When the members return to the locus of static equilibrium the connector $57^k$ is brought into tensioned engagement with the parts to which it is coupled; and any rebound of the body and axle members, above normal load position, imposes an upward pull on the inner end of the lever frame $86^k$, which results in a counter-clockwise rotation of that frame on its pivot support $11^k$. This movement depresses the follower plate 93 and imposes an increased compression on the supplemental springs $4^k$, which is transmitted, through the bracket connection 92, to the end of the main spring, and thereby again subjects the latter to a correspondingly increased bending stress and strain. These cooperative and conjoint flexures of the primary and secondary suspension elements (on rebound) are progressively and concurrently increased until the parts have been moved from position B to positions E—$e$ (as shown in full lines in Fig. 34 and partially indicated in dotted lines in Fig. 33) and the central bearing collar of the follower plate 93 has been brought into engagement with the head of the T shaped bracket 92; but after this the supplemental springs are locked against further compression, and the continued separation of the body and axle members is resisted and checked by the greatly increased positive bending of the outer portion of the main spring alone. During these successive movements of the system the lateral sway or transverse rolling of the body on its elastic supports—which tends to twist or turn the side leaf springs on their longitudinal axes—is restrained by the balanced pressures of the supplemental-spring-lever connections on the opposite edges of the said main springs; and when the parts are subjected to rebound stresses the longitudinal pitching of the tonneau, on the front and rear side leaf supports is resisted and checked by the tension of the connector elements $57^k$.

All of the various spring suspension systems hereinbefore described are characterized by the same basic principle or mode of operation; i. e., the elastic balancing and the ultimate absorption of both compression and rebound stresses and shocks—which are superimposed on the normal or static load carried by the system—by a positive increase in the initial tensions or flexures of two or more resilient elements, of vary flexibility, which are conjoined in such manner that the lighter stresses, and the smaller displacements of the parts, are resisted and checked in large measure by the flexural action of the more pliant, or secondary, springs, while the more severe stresses and the larger oscillatory movements, are resisted and arrested, first, by the cooperative increased flexure of both the secondary and the primary springs, and second, by the locking of the secondary springs against further compression and the continued and augmented compression of the primary springs, alone. Or stated in another way, the various shock absorber organizations, that exemplify my present invention, are all characterized by a generic mode of action which involves the positive conjoint compression, or increased flexure, of two or more interconnected springs of different strength, whenever the relatively-movable-spring-supported parts move in either direction from the position of static equilibrium—as distinguished from the usual operation of primary and secondary spring combinations, in which rebound movements are accompanied by a decreased strain, and a recoil or negative flexure, in one or both of the resilient suspension elements—and which further involves the arrest of the progressively increased compression of the more flexible supplemental spring, or springs, when the movements, in either direction, have attained a certain amplitude, and the continued positive flexure of the stiffer main spring member by further movement beyond such points of arrest.

From a structural standpoint the various illustrative embodiments of my invention also present certain generic features of correspondence. All of the organizations herein disclosed comprise a combination of a relatively stiff resilient support elements (generally designated as a primary or main spring) with a relatively flexible secondary or supplemental suspension member in series therewith—so that the stress and strain on the one element is transmitted to the other— and a system of lever connections for conjoining, or operatively coupling, both of the aforesaid units with the two relatively-movable-spring-supported parts in such manner that any movement of the said parts, in either direction from the position of static equilibrium, will impose an increased flexure, or compression, on both the primary and the secondary suspension members. The different exemplifications of my invention that have been described, present several forms of lever-connections, that are adapted to perform the generic function last mentoned; but all of these conjunctive systems comprise a lever, which is pivotally mounted on one of the relatively movable parts of the organization and is coupled to the other of the said movable parts by a flexible or "one way" connection that is active or operative only during rebound movements; and further comprises continuously acting elements that serve to engage the lever with both the secondary and the primary springs and to flex the latter in the same direction, i. e., positively, whenever the spring supported members move in either direction from normal load position. All of these systems likewise contain "stop" elements, which are adapted to arrest the action of the lever system on the secondary spring—and prevent further positive compression of that element—when the displacement movements have attained a certain predetermined magnitude; but which do not interfere with the continued action of the system, in progressively increasing the flexure of the primary spring, when the movements exceed that amplitude. The general functional arrangement of lever-connections constitutes what may be termed an irreversible spring-controlling system; viz, a system which prevents any reflexing, or expansion, of the elastic support elements beyond their initially tensioned normal load form; but which imposes, on the contrary, a one-way positive and progressive increase in the elastic strain on those elements whenever the parts supported thereby are kinetically displaced, in either direction, from the position of static equilibrium. It is to be understood that the terms "irreversible-control mechanism," or "irreversible control linkage," etc., which are hereinafter used in the claims, refer to a kinematical assemblage of lever and link connections, between the primary and the secondary springs and the movable members supported thereby, which present the functional and result-attaining characteristics last described; i. e., the word "irreversible" is used to designate the functional nature of the control action that is exercised by the "mechanism" or "linkage," and not to describe or indicate any fixed structural relationship, or any particular direction of movement, of the linkage elements.

It will be further understood—from a comparative review of the various illustrative constructions heretofore disclosed—that the basic features of my invention may be embodied in a number of varied species and types of elastic suspension systems; and the utilization of my improvements, in whole or in any desired part, is not dependent upon the employment of any specific form, or any specific number, of primary and secondary springs. Figs. 4, 5 to 9, 11 to 14, 18 to 20, 22, 26 to 28, and 31—32, show exemplifications of my invention as applied to main cross leaf spring suspensions; Figs. 16—17, 25 and 30 illustrate applications of my invention to main side leaf spring supports of the semi-elliptic type; and Fig. 33 depicts an embodiment of my improvements in which the primary spring unit is of the three-quarter elliptic, or scroll support form. The different figures of my drawings show a still greater variety of supplemental or secondary suspension members of both the leaf spring and the coil spring type, and of both the single or multiple form of construction. Thus Figs. 26 and 30 illustrate the use of a supplemental suspension unit which consists of a single spring (in one case a leaf and in the other case a coil spring) which is flexed or compressed from the same side, or in the same direction, by either the closing or the rebound movements of the system. Figs. 22 and 25 show a secondary spring unit which comprises a pair of helical coils (of either the compression or the expansion form), which are likewise flexed in the same direction— i. e., by a downward movement of the ends that are connected to the actuating lever system—whenever the spring supported parts are moved in either direction from normal load position. Figs. 31 and 32 depict another single coil supplemental spring unit which is increasingly compressed in reverse directions—i. e., by alternate movements of the opposite ends—when the relatively movable vehicle members are displaced in opposite directions from the point of static equilibrium. Figs. 4, 11 to 14, 16—17, and 33 present examples of secondary suspension members of the multiple coil double-acting spring form, which are so connected to the irreversible-control-linkage system, that they are compressed from opposite ends—and pro-tanto in opposite directions—in their alternate restraint of compressive and rebound movements. And Figs. 5 to 9, and 18 to 20 illustrate the use of supplemental suspension units which comprise a pair of counteracting spring elements—of either the single or multiple spring form—which are alternately compressed from opposite sides, and in reversed directions, by the action of the irreversible control mechanism associated therewith. I wish to be understood as using the general terms "supplemental spring member" or "secondary spring unit" etc., to cover all such arrangements of single or multiple spring construction as those last enumerated, or any others that are capable of performing substantially the same functions and of attaining the same generic results.

I have described a considerable number of varied forms of mechanism for the utilization of my present invention for the purpose of indicating its wide range of application, but not for the purpose of imposing any limits thereon. With the preceding disclosure as a guide, engineers, who are familiar with this art, will be able to design many other individual forms of construction that may be required, or deemed suitable, to best embody either my generic or specific improvements—in whole or in part as may be desired—in particular species or types of elastic suspension systems or in conjunction with specific or peculiar forms of chassis frame structures or vehicles bodies.

I claim—

1. In a shock absorber organization for two relatively movable members the combination of a primary spring, a secondary spring, and an irreversible control linkage conjoining the said members with the said springs and acting to impose a concurrently increased flexure thereon whenever the said numbers are moved from the position of static equilibrium, substantially as described.

2. In a spring suspension system for vehicles the combination of a main spring unit, a supplemental spring unit, and means conjoining said units with the relatively movable members of the vehicle whereby both spring units are increasingly flexed whenever the said members are displaced in either direction from normal load position.

3. An elastic suspension system for supporting two relatively movable members which comprises a main spring member, a supplemental spring member in series therewith, and an irreversible control-mechanism conjoining the said members and acting to concurrently subject both of said springs to an increased stress whenever the said movable members either approach or separate from each other.

4. An elastic suspension system for chassis frames which comprises the combination of a main spring unit, a relatively flexible secondary spring unit, a lever pivotally mounted on one of the relatively movable parts of the chassis frame, and means conjoining the said lever with the said springs whereby the latter are both subjected to a progressively increasing positive flexure whenever the said movable parts are displaced in either direction from the position of static equilibrium.

5. A shock absorber organization for vehicles, which comprises the combination of a primary spring member, a secondary spring member, a lever pivotally mounted on one of the relatively movable vehicle parts, a lost motion connection between said lever and the other relatively movable vehicle part, and means conjoining the said lever and the said connections with both of the said springs whereby the latter are cooperatively and increasingly flexed whenever said vehicle parts are moved in either direction from normal load position.

6. In an elastic suspension system the combination of two spring units arranged in series with each other, an irreversible control mechanism connecting the spring units with two relatively movable members whereby the said units are both subjected to a progressively increased flexural strain when the said members are displaced in either direction from the point of static equilibrium, and a pair of stops for arresting the progressive flexure of one of the said units at predetermined points in the said displacements.

7. In an elastic support for two relatively movable members the combination of a main spring unit, a supplemental spring unit coacting in series therewith, an irreversible control-mechanism connecting the said units with the said members, and stops for arresting the movement of the lever connection with the supplemental spring at predetermined points in the relative displacement of the said members.

8. A shock absorber construction for vehicles which comprises the combination of a primary spring unit, a supplemental spring unit, a lever pivotally mounted on one of the relatively movable vehicle members and coupled to the other of said members by a one way connection, means for conjoining said lever and said coupling connection with both of said spring units whereby the latter are increasingly flexed by any displacement of the said relatively movable members from their normal static load position, and means for arresting the flexure of the supplemental spring unit at predetermined points in said displacement without interfering with the continued flexure of the primary spring unit.

9. An elastic suspension system for vehicles which comprises the combination of two spring units of varied flexibility, an irreversible control linkage conjoining both of said units with two relatively movable parts of the vehicle, and means for restraining lateral displacements of the said parts when the latter oscillate vertically with respect to each other.

10. An elastic support system for two relatively movable members which comprises a primary spring unit, a secondary spring unit, and means for conjoining the said members with the said units whereby the latter are cooperatively subjected to a progressively increased flexural stress and the former are restrained from relative lateral displacement whenever the said members are moved in either direction from the position of static equilibrium.

11. An elastic support system for vehicles which comprises the combination of a main leaf spring unit, a supplemental spring unit coacting in series therewith, means for imposing an increased flexural strain on both units when the body and axle members of the vehicle approach each other, means for imposing a correspondingly increased strain on both of said springs and for restraining the relatively lateral displacement of the said members when the latter rebound above the position of static equilibrium, and means for arresting the flexure of the supplemental spring units when the body and axle parts have moved a predetermined distance from said position.

12. A spring suspension system for vehicles which comprises a main spring unit, a supplemental spring unit, an irreversible control linkage connecting the said units to the body and axle members of the vehicle, and means for damping the elastic oscillations of the system, substantially as described and for the purposes specified.

13. A shock absorber organization for two relatively movable members which comprises a plurality of elastic suspension units of varied flexibility, means conjoining the said members with the said units whereby the latter are progressively and increasingly flexed when the former are moved in either direction from the position of static equilibrium, and means for restraining the free elastic oscillations of the suspension units and for resisting the relative sidewise displacement of the movable members.

14. An elastic suspension organization for vertically movable members which comprises the combination of a primary spring member, a secondary spring member, an irreversible-control-system conjoining the said members and including means for maintaining the movable parts in substantial vertical alinement, and other means for damping and restraining the free elastic oscillations of the said spring members, substantially as described.

15. An elastic suspension organization for vehicles which comprises the combination of a plurality of spring units of varied flexibility, an irreversible-control-linkage conjoining the said units with the body and axle members of the vehicle, means for restraining any relative sidewise displacement of the said vehicle members, and means for imposing a frictional resistance to the elastic oscillations of the suspension system and thereby damping and retarding any relative movement of the body and axle parts in any direction.

16. In a spring suspension system for two relatively movable members the combination of a plurality of elastic units, means for irreversibly connecting the said units with the said members whereby any movement of the latter from normal load position is resisted by a cooperatively increased compression of the spring elements, means for arresting the progressively increasing flexure of one of the said elements when the said members have moved a predetermined distance from the said normal position, means for maintaining the movable members in substantially vertical alignment, and means for damping the free elastic oscillations of the system, substantially as described.

17. In a shock absorber organization for vehicles the combination of a main spring, a plurality of supplemental springs cooperating therewith, means for irreversibly connecting said springs with the body and axle members whereby any relative movement of the said members from normal load position will impose a progressively increasing flexure on both the primary and the supplemental springs, and means for restraining both the lateral rolling and the longitudinal pitching of the vehicle body on its axle supports, substantially as described.

18. In an elastic suspension system for two relatively movable members the combination of a main leaf spring a plurality of supplemental springs symmetrically positioned at opposite sides of the said main spring and supported on a flexible portion thereof, means for irreversibly conjoining the said members with the said springs whereby the latter are cooperatively and increasingly flexed whenever the former are moved in either direction from their static load position, means for restraining any relative lateral displacement of the said members during such movement, and means for arresting the progressively increasing flexure of the supplemental springs without interfering with the continued flexure of the main spring when the said movement exceeds a predetermined magnitude.

19. An elastic suspension system for vehicles which comprises the combination of a main spring, a supplemental spring, an expansible and collapsible cell for enclosing the said supplemental spring, means for compressing said supplemental spring and cell when the body and axle members are moved in either direction from the position of static equilibrium and means for damping the normal expansion of the compressed springs.

20. A shock absorber organization for two relatively movable members which comprises the combination of a main spring, a plurality of supplemental springs symmetrically disposed with respect thereto, a corresponding plurality of substantially closed cells surrounding the said supplemental springs, an irreversible-control-linkage conjoining the said members with the said springs whereby the latter are progressively and increasingly flexed by any movement of the said members from normal load position, and means for interposing a fluid pressure resistance to any expansion of the flexed springs and thereby retarding the free elastic recoil thereof.

21. An elastic suspension system for vehicles which comprises the combination of a main leaf spring rigidly secured at its central portion to one of the relatively movable vehicle members, a supplemental spring mounted on another relatively flexible portion of said main spring, an irreversible-control-mechanism conjoining the other relatively movable vehicle member with the said springs whereby the latter are increasingly flexed by any movement of the members from normal load position, and means for interposing a damping resistance to the recoil or return of the flexed springs to said normal position.

22. An elastic suspension system for vehicles which comprises the combination of a main spring unit, a supplemental spring unit, a lever member flexibly mounted on one of the relatively movable vehicle members and connected to the supplemental spring, a second lever pivoted to the first lever and coupled to the other of the said relatively movable vehicle members by a one way connection whereby both springs are increasingly flexed whenever the said members move in either direction from the normal load position.

23. A shock absorber organization for two relatively movable members which comprises a plurality of spring units, a rigid lever flexibly supported on one of the said members and coupled to one of the said units, an auxiliary lever pivotally joined to the first lever and irreversibly connected to the other of said members, and means for limiting the pivotal movement of one of said levers with respect to the other.

24. An elastic suspension system for vehicles which comprises the combination of primary and secondary springs, a lever flexibly mounted on one of the relatively movable vehicle members and continuously engaged with the secondary spring elements, an auxiliary lever pivotally mounted on the first lever and operatively connected with the primary spring and with another relatively movable vehicle member, and means for locking the said levers relatively to each other at predetermined points in their movement.

25. In a spring suspension system for two relatively movable members, the combination of a primary spring secured at its center to one of said members, a secondary spring supported on a relatively flexible portion of said primary spring, a lever pivotally mounted for rotation with respect thereto, means for engaging the said lever with said secondary spring, an auxiliary lever pivoted to the first named lever, means irreversibly connecting said auxiliary lever to one of said relatively movable members, and means for limiting the angular movement of both levers on their respective pivots.

26. In a shock absorber construction for vehicles the combination of a main leaf spring, a plurality of supplemental springs symmetrically disposed with respect thereto, a pair of lever members pivotally connected with each other, means for engaging one of the said members with the main spring, means for engaging the other of said members with the supplemental springs, and other means for flexibly coupling the said levers to the body and axle parts respectively.

27. An elastic suspension system for vehicles which comprises the combination of a main leaf spring, a supplemental spring unit flexibly engaged at one of its extremities with the said main spring, a lever pivotally supported on one of the relatively movable vehicle members and operatively connected to the said supplemental spring, a stop for limiting the angular movement of the lever on its pivotal support, and an irreversible-control-mechanism conjoining the said lever with another of the relatively movable vehicle members whereby the interengaged main and supplemental springs are cooperatively subjected to an increased flexure when the vehicle members rebound above normal static load position.

28. In a shock absorber system for two relatively movable members the combination of a plurality of springs operatively interposed between the said members, means conjoining said springs in constant series relationship, one way connections acting to impose concurrently increased flexures on the series coupled springs when the members are forced toward each other, and a second one way connection adapted to also impose a progressively increased flexure on the said springs when the members are separated beyond the position of static equilibrium.

29. In a resilient suspension system for vehicles, the combination of a main spring rigidly attached to one of the relatively movable members thereof, a supplemental spring supported on an intermediate portion of the said main spring, and means conjoining both of said springs with another relatively movable member whereby these springs are conjointly subjected to an increased flexure whenever the aforesaid vehicle members are moved in either direction away from normal load position.

30. In a shock absorber system for two relatively movable members, a combination of a main spring rigidly attached to one of said members, a supplemental spring supported on an intermediate part of the said main spring, a lever system conjoining the said springs in constant series relationship with one another, and a lost motion connection between said lever system and the member on which the said main spring is mounted and adapted to impose a concurrently increased flexure on both of said springs when the relatively movable members are separated beyond their normal load position.

31. In a spring suspension system for the relatively movable parts of a vehicle, the combination of one spring rigidly mounted one of said parts, another spring supported on an intermediate flexible portion of the first spring, a plurality of levers conjoining said springs in constant series relationship, means for maintaining said lever elements in substantially fixed relation with respect to each other when the said parts are moved in one direction from the normal load position, and other means for moving the said lever elements relatively to each other and thereby concurrently imposing increased flexure on both springs when the said parts are moved in the opposite direction from their normal load position.

32. A shock absorber system for vehicles which comprises a main spring, a supplemental spring cooperating therewith in elastically resisting displacement of the vehicle members in either direction from normal load position, a liquid resistance for damping the recoil of the said springs from one direction of displacement, and a pneumatic restraint for retarding the recoil of the springs from the other direction of displacement.

In witness whereof, I, have hereunto set my hand at Indianapolis, Indiana, this 6th day of July, A. D., one thousand nine hundred and twenty.

FRANK L. O. WADSWORTH.